United States Patent
Ho (10) Patent No.: US 12,331,468 B2
(45) Date of Patent: Jun. 17, 2025

(54) COMPOSITE WATERPROOF CORRUGATED PAPER AND MANUFACTURING METHOD THEREOF

(71) Applicant: TAIWAN LUNG MENG ADVANCED COMPOSITE MATERIALS CO., LTD., Tainan (TW)

(72) Inventor: Ding-Shyan Ho, Tainan (TW)

(73) Assignee: TAIWAN LUNG MENG ADVANCED COMPOSITE MATERIALS CO., LTD., Tainan (TW)

( * ) Notice: Subject to any disclaimer, the term of this patent is extended or adjusted under 35 U.S.C. 154(b) by 110 days.

(21) Appl. No.: 17/181,326

(22) Filed: Feb. 22, 2021

(65) Prior Publication Data
US 2022/0002950 A1    Jan. 6, 2022

(30) Foreign Application Priority Data
Jul. 2, 2020 (TW) ................ 109122417

(51) Int. Cl.
*D21H 27/36* (2006.01)
*B32B 3/28* (2006.01)
(Continued)

(52) U.S. Cl.
CPC ............ *D21H 27/36* (2013.01); *B32B 3/28* (2013.01); *B32B 7/12* (2013.01); *B32B 27/10* (2013.01);
(Continued)

(58) Field of Classification Search
CPC .......... B32B 29/08; B32B 7/12; B32B 27/10; B32B 2250/40; B32B 3/28; B32B 2305/08
(Continued)

(56) References Cited

U.S. PATENT DOCUMENTS 3,723,222 A * 3/1973 Kurita ................ B32B 27/304
156/332
3,775,521 A * 11/1973 Yamamoto .......... C08K 5/0016
264/45.3

(Continued)

FOREIGN PATENT DOCUMENTS

CN    101896567 A    11/2010
CN    102886953 A     1/2013
(Continued)

OTHER PUBLICATIONS

Search report for TW109122417, Issued on Nov. 1, 2021, Total of 1 page.
(Continued)

*Primary Examiner* — Alicia J Weydemeyer
(74) *Attorney, Agent, or Firm* — Apex Juris, pllc; R. Lynette Wylie (57) ABSTRACT

A composite waterproof corrugated paper includes a stone paper medium and at least one stone liner paper. The stone paper medium has a first fluting surface and includes at least one first body layer and at least one adhesive layer which are coextruded. The first body layer includes a first surface. The adhesive layer is disposed on the first surface. The stone liner paper includes at least one second body layer and a supplementary layer which are coextruded. The supplementary layer is disposed on the second body layer and is attached to several wave crests of the first fluting surface, so that the stone paper medium adheres to the stone liner paper via the adhesive layer. A manufacturing method of the composite waterproof corrugated paper is also provided in the present invention.

21 Claims, 4 Drawing Sheets

(51) Int. Cl.
  *B32B 7/12* (2006.01)
  *B32B 27/10* (2006.01)
  *D21F 11/12* (2006.01)
  *D21H 17/14* (2006.01)
  *D21H 17/68* (2006.01)
  *D21H 19/22* (2006.01)
  *D21H 21/16* (2006.01)

(52) U.S. Cl.
  CPC ............. *D21F 11/12* (2013.01); *D21H 17/14* (2013.01); *D21H 17/68* (2013.01); *D21H 19/22* (2013.01); *D21H 21/16* (2013.01); *B32B 2250/05* (2013.01); *B32B 2250/40* (2013.01)

(58) Field of Classification Search
  USPC ......................... 428/183, 184; 156/210, 205
  See application file for complete search history.

(56) References Cited

U.S. PATENT DOCUMENTS

| | | | | |
|---|---|---|---|---|
| 4,204,016 A | * | 5/1980 | Chavannes | ............... B32B 3/28 |
| | | | | 428/184 |
| 6,492,032 B1 | * | 12/2002 | Irick, Jr. | .............. G03C 1/8155 |
| | | | | 428/512 |

| | | | |
|---|---|---|---|
| 2007/0187054 A1 | | 8/2007 | Koike |
| 2010/0317802 A1 | * | 12/2010 | Aoyama ..................... C09J 7/38 |
| | | | 525/190 |

FOREIGN PATENT DOCUMENTS

| | | |
|---|---|---|
| CN | 103273715 A | 9/2013 |
| CN | 106480786 A | 3/2017 |
| CN | 206856185 U | 1/2018 |
| CN | 107984859 A | 5/2018 |
| CN | 209260445 U | 8/2019 |
| JP | 19981026812 A | 1/1998 |

OTHER PUBLICATIONS

English abstract for CN107984859, Total of 1 page.
English abstract for CN102886953, Total of 1 page.
English abstract for CN106480786, Total of 1 page.
Search Report for CN2021107494036, Issued on Feb. 21, 2023, Total of 3 pages.
Translation of Abstract of CN103273715. Total of 1 page.
Translation of Abstract of CN101896567, Total of 1 page.
Search Report for CN2021107494036, Issued on Aug. 18, 2023, Total of 5 page.
English Abstract for CN209260445, Total of 1 page.
English Abstract for CN206856185, Total of 1 page.

* cited by examiner

COMPOSITE WATERPROOF CORRUGATED PAPER AND MANUFACTURING METHOD THEREOF

BACKGROUND OF THE INVENTION

Technical Field

The present invention relates generally to a corrugated paper, and more particularly to a composite waterproof corrugated paper and a manufacturing method thereof.

Description of Related Art

Paper materials of a conventional corrugated paper for packaging, especially a corrugated carton, are usually made from wood pulp, and the wood pulp is made from wood fiber. Although a part of paper manufacturers makes efforts to obtain FSC certification (issued by Forest Stewardship Council), most of environmental organizations still suggest reducing the usage of wood pulp paper sheets in order to prevent deforestation, because trees grow very slowly.

Since the conventional corrugated carton made from wood pulp papers has enough strength and is convenient for being transported, the conventional corrugated carton has been applied in various fields to package and to protect products. However, when the conventional corrugated carton is used for packaging products which are refrigerated or frozen, droplets are condensed on a surface of the conventional corrugated carton due to a raising temperature after the corrugated carton is taken out of a refrigerator. If the droplets condensed on the surface of the corrugated carton aren't wiped out immediately, the droplets will be infiltrated into the conventional corrugated carton to make the conventional corrugated carton wet and weak. The wet corrugated carton is not only hard to be transported but also easily damaged, and the products stored in the corrugated carton will be damaged as well.

In addition, corrugated papers made of wood pulp papers can't tolerant a low temperature lower than or equal to minus 40 degrees Celsius. The pulp papers are easy to absorb moisture, so that when the corrugated carton made of the wood pulp papers is stored in the refrigerator, a fiber structure of the corrugated carton made of the wood pulp papers is easily broken when the absorbed moisture freezes and expands. Therefore, the corrugated carton stored in a refrigerator for a long time will be gradually damaged and broken, becoming unable to be used. On the other hand, after the corrugated carton is repeatedly frozen and unfrozen, the structure of the corrugated carton made of the wood pulp papers becomes not only wet, soft, weak, and hard to be transported, but also easily allowing mold and bacteria growth, resulting in increase of a safety risk of food packaging. Although a part of the corrugated carton made of the wood pulp papers is added with an antibacterial and antifungal agent to prevent the mold and bacteria growth, a part of the antibacterial and antifungal agent may be dissolved into the packaged food, increasing the safety risk of the packaged food. Additionally, conventional papers are made from wood pulp. A large amount of agents, such as strong acids, strong alkalis, and bleach, needs to be used to turn the wood into the wood pulp, and these agents are harmful to the environment.

A corrugated box made of plastic hollow boards is existed on the market to replace the conventional corrugated carton made of the wood pulp papers, wherein a production speed of the corrugated box made of the plastic hollow boards is 15 M/min, and a raw material contains a high percentage of plastic and a low percentage of inorganic powder, which goes against a policy of limiting or reducing plastic promoted by countries around the world. Besides, the plastic hollow boards cannot prevent the bacteria from growing.

In conclusion, to manufacture the conventional corrugated box needs to fell trees, causing damage to the forest environment. Besides, the corrugated box made of wood pulp paper has worse durability under a cooling or freezing environment. If manufacture the corrugated box by the plastic hollow boards, the more production lines are needed to promote a yield, and a large amount of plastic is needed to be consumed for producing. Therefore, a new corrugated box is needed to overcome the problems existed in the conventional corrugated box made of the wood pulp paper or the plastic hollow boards.

BRIEF SUMMARY OF THE INVENTION

In view of the above, the primary objective of the present invention is to provide a composite waterproof corrugated paper, wherein a thickness of the composite waterproof corrugated paper is between 0.6 mm and 6.0 mm; a main ingredient of the composite waterproof corrugated paper includes an inorganic stone powder which is made by grinding a natural stone, and a little of linear polyolefin plastic material is added for binding. Therefore, a manufacturing method of the composite waterproof corrugated paper provided by the present invention could completely avoid using wood pulp, so that it could avoid using a strong acid, a strong alkalis, and bleach and decrease the consumption of water resources. Besides, comparing with a conventional corrugated paper made of wood pulp papers, the composite waterproof corrugated paper provided by the present invention has significant waterproof and frost resistant ability. Even though the composite waterproof corrugated paper is frozen and unfrozen repeatedly, the composite waterproof corrugated paper could maintain a good strength and still could be transport easily without being broken. Therefore, the composite waterproof corrugated paper provided by the present invention could be adapted to package products which need to be cooled or frozen, such as vegetable, fruit, fish, meat, and so on. The composite waterproof corrugated paper provided by the present invention could tolerate a low temperature lower than or equal to minus 40 degrees Celsius. Besides, the composite waterproof corrugated paper doesn't absorb water (moisture), and calcium carbonate has an antibacterial effect, so that the mold or bacteria cannot grow, thereby ensuring the hygiene of the packaged food without adding an additional antibacterial and antifungal agent to avoid food safety issue. Moreover, the composite waterproof corrugated paper provided by the present invention could be recycled after conducting a simple sanitizing process, thereby to reach a goal of reducing waste. It is worthy to mention that comparing to the conventional corrugated paper made of the wood pulp papers, the composite waterproof corrugated paper provided by the present invention could significantly reduce the production cost, so that the usage of the conventional corrugated carton made of the wood pulp papers could be reduced, thereby to reduce deforestation. Additionally, the composite waterproof corrugated paper provided by the present invention is made from natural stone powder, which could be easily decomposed in a natural environment. Therefore, a goal of environmental sustainability and environmental protection could be achieved.

Additionally, a maximum production speed of a corrugated paper made of polypropylene (PP) plastic hollow boards is only 10-15 M/min. In contrast, a production speed of the composite waterproof corrugated paper provided by the present invention could reach 150 M/min or even faster, and the material of the composite waterproof corrugated paper provided by the present invention only contains a low percentage (lower than 30 wt %) of the plastic. Therefore, the composite waterproof corrugated paper could be mass-produced and achieve a goal of reducing plastic (reducing 70%-80% of the plastic material used for producing the corrugated paper made of plastic hollow boards) at the same time.

The present invention provides a composite waterproof corrugated paper including a stone paper medium and at least one stone liner paper, wherein the stone paper medium has a first fluting surface and includes at least one first body layer and at least one adhesive layer which are coextruded. The at least one first body layer includes a first surface, and the at least one adhesive layer is disposed on the first surface of the at least one first body layer. The first fluting surface is located on the at least one adhesive layer. The at least one stone liner paper includes at least one second body layer and a supplementary layer which are coextruded, wherein the supplementary layer is disposed on the at least one second body layer and is attached to a plurality of wave crests of the first fluting surface. The at least one first body layer and the at least one second body layer respectively includes an inorganic material and a first plastic material, wherein the inorganic material accounts for 60 wt %-85 wt % of a weight of the at least one first body layer and a weight of the at least one second body layer respectively, and the first plastic material accounts for 15 wt %-40 wt % of the weight of the at least one first body layer and the weight of the at least one second body layer respectively; the at least one adhesive layer includes a second plastic material, a third plastic material, and an elastic material; the second plastic material accounts for 30 wt %-50 wt % of a weight of the at least one adhesive layer, and the third plastic material accounts for 30 wt %-50 wt % of the weight of the at least one adhesive layer, and the elastic material accounts for 0 wt %-40 wt % of the weight of the at least one adhesive layer; a composition of the supplementary layer is the same as the at least one adhesive layer or is made of a polymer.

In addition, the another primary objective of the present invention is to provide a manufacturing method of a composite waterproof corrugated paper including at least following steps:

provide a stone paper medium, wherein the stone paper medium includes at least one first body layer and at least one adhesive layer (124, 164) which are coextruded; the at least one first body layer (122, 162) includes a first surface; the at least one adhesive layer (124, 164) is disposed on the first surface of the at least one first body layer;

make the stone paper medium be wave-shaped and have a first fluting surface, wherein the first fluting surface is located on the at least one adhesive layer;

provide at least one stone liner paper, wherein the at least one stone liner paper includes at least one second body layer and a supplementary layer which are coextruded; the supplementary layer is disposed on the at least one second body layer;

heat the stone paper medium to make the at least one adhesive layer in a molten state; and attach the supplementary layer of the at least one stone liner paper to a plurality of wave crests of the first fluting surface, so that the stone paper medium and the at least one stone liner paper are adhered via the at least one adhesive layer which is in the molten state;

wherein the at least one first body layer and the at least one second body layer respectively includes an inorganic material and a first plastic material; the inorganic material accounts for 60 wt %-85 wt % of a weight of the at least one first body layer and a weight of the at least one second body layer respectively, and the first plastic material accounts for 15 wt %-40 wt % of the weight of the at least one first body layer and the weight of the at least one second body layer respectively; the at least one adhesive layer includes a second plastic material, a third plastic material, and an elastic material; the second plastic material accounts for 30 wt %-50 wt % of a weight of the at least one adhesive layer, and the third plastic material accounts for 30 wt %-50 wt % of the weight of the at least one adhesive layer, and the elastic material accounts for 0 wt %-40 wt % of the weight of the at least one adhesive layer; a composition of the supplementary layer is the same as the at least one adhesive layer or is made of a polymer.

The present invention further provides a usage of the waterproof corrugated paper for packaging all kinds of frozen seafood and meat or for packaging the vegetables and fruits which are cooled down by spraying 5-13 degrees Celsius water The main ingredient of the composite waterproof corrugated paper includes the inorganic powder made by grinding natural stone and a little of the linear polyolefin plastic material for binding. Therefore, the composite waterproof corrugated paper could completely avoid using wood pulp. Besides, comparing to the conventional corrugated paper made of the wood pulp papers, the composite waterproof corrugated paper provided by the present invention has significant waterproof and frost resistant ability. Even though the composite waterproof corrugated paper is frozen and unfrozen repeatedly, the composite waterproof corrugated paper could maintain a good strength and still could be easily transported without being broken, thereby avoiding changing the package during transportation or shipping. Therefore, the composite waterproof corrugated paper provided by the present invention could be applied to package products which need to be cooled or frozen, such as vegetables, fruits, fish, meat, and so on.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
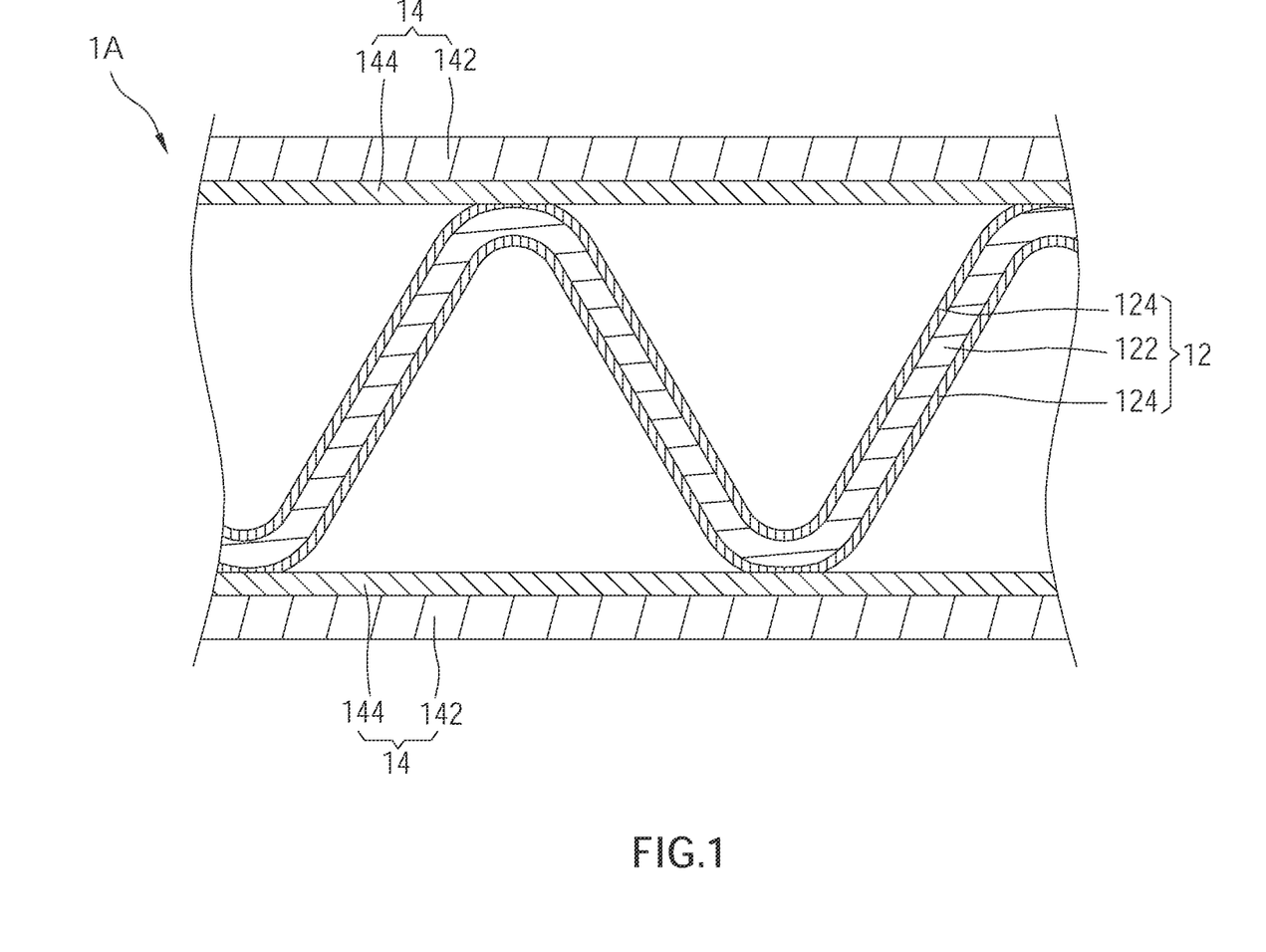
FIG. 1 is a schematic diagram of the composite waterproof corrugated paper according to a first embodiment of the present invention.

Referring to FIG. 1 which is a schematic diagram of a composite waterproof corrugated paper 1A according to a first embodiment of the present invention, the composite waterproof corrugated paper 1A includes a stone paper medium 12 and at least one stone liner paper 14, wherein the stone paper medium 12 has a first fluting surface, and the stone liner paper 14 is attached to a plurality of wave crests of the first fluting surface.

The stone paper medium 12 includes at least one first body layer 122 and at least one adhesive layer 124 which are coextruded, wherein the first body layer 122 includes a first surface. The adhesive layer 124 is disposed on the first surface of the first body layer 122, and the first fluting surface is located on the adhesive layer 124. In the current embodiment, the at least one adhesive layer 124 includes a plurality of adhesive layers 124, and the first body layer 122 includes a second surface opposite to the first surface, and the stone paper medium 12 has a second fluting surface opposite to the first fluting surface, wherein one of the adhesive layers 124 is disposed on the first surface of the first body layer 122, and another one of the adhesive layers 124 is disposed on the second surface of the first body layer 122; the first fluting surface is located on one of the adhesive layers 124, and the second fluting surface is located on another one of the adhesive layers 124. In an embodiment, the stone paper medium 12 includes a first body layer 122 and two adhesive layers 124, wherein the first body layer 122 is located between the two adhesive layers 124, and the first body layer 122 and the two adhesive layers 124 are coextruded.

The stone liner paper 14 includes at least one second body layer 142 and a supplementary layer 144 which are coextruded, wherein the supplementary layer 144 is disposed on the second body layer 142 and is attached to the wave crests of the first fluting surface, so that the stone paper medium 12 and the stone liner paper 14 adhere via the adhesive layer 124. In the current embodiment, the at least one stone liner paper 14 includes a plurality of stone liner papers 14, wherein the supplementary layer 144 of one of the stone liner papers 14 is attached to the wave crests of the first fluting surface, so that the stone paper medium 12 and the stone liner paper 14 are adhered via one of the adhesive layers 124, while the supplementary layer 144 of another one of the stone liner papers 14 is attached to a plurality of wave crests of the second fluting surface, so that the stone paper medium 12 and the stone liner paper 14 are adhered via another one of the adhesive layers 124.

An inorganic material accounts for 60 wt %-85 wt % of a weight of each of the first body layer 122 and the second body layer 142, and a first plastic material accounts for 15 wt %-40 wt % of the weight of each of the first body layer 122 and the second body layer 142. In the current embodiment, a sum of weight percentages of the inorganic material and the first plastic material is equal to 100 wt % of each of the first body layer 122 and the second body layer 142. A second plastic material accounts for 30 wt %-50 wt % of a weight of the adhesive layer 124, a third plastic material accounts for 30 wt %-50 wt % of the weight of the adhesive layer 124, and an elastic material accounts for 0 wt %-40 wt % of the weight of the adhesive layer 124. In the current embodiment, a sum of weight percentages of the second plastic material, the third plastic material, and the elastic material is equal to 100 wt % of the adhesive layer 124. A composition of the supplementary layer 144 is the same as the adhesive layer 124 or is made of a polymer.

In the first embodiment, the polymer includes polyethylene (PE), polypropylene (PP), polystyrene (PS), acrylonitrile-butadiene-styrene copolymer (ABS resin), polyester, polyamide (PA), polyurethane (PU), polycarbonate (PC), polyvinyl chloride (PVDC), poly methyl methacrylate (PMMA), polytetrafluoroethylene (PTFE), polyether ether ketone (PEEK), polyetherimide, polylactic acid (PLA), or a combination thereof.

In the first embodiment, the first plastic material includes high-density polyethylene (HDPE), polypropylene (PP), polystyrene (PS), or a combination thereof; the second plastic material includes high-density polyethylene (HDPE); the third plastic material includes ethylene-vinyl acetate copolymer (EVA), low-density polyethylene (LDPE), linear low-density polyethylene (LLDPE), metallocene linear low-density polyethylene (MLLDPE), or a combination thereof; the inorganic material is an inorganic powder with a grain size of 2-10 micrometers ($\mu$m), wherein the inorganic powder made by grinding a natural stone; the elastic material includes a mixture of a metal glue and polyolefin elastomer.

In the first embodiment, a total thickness of the adhesive layer 124 is 0.05-0.15 times a total thickness of the first body layer 122 of the stone paper medium 12, and a total thickness of the supplementary layer 144 is 0.05-0.15 times a total thickness of the second body layer 142 of the stone liner paper 14.

In the first embodiment, an additive accounts for smaller than 2 wt % of a weight of each of the first body layer 122 and the second body layer 142, and includes a processing additive, a slip agent, a toughening agent, or a combination thereof, wherein the slip agent includes zinc stearate, magnesium stearate, or a combination thereof.

Figure 2:
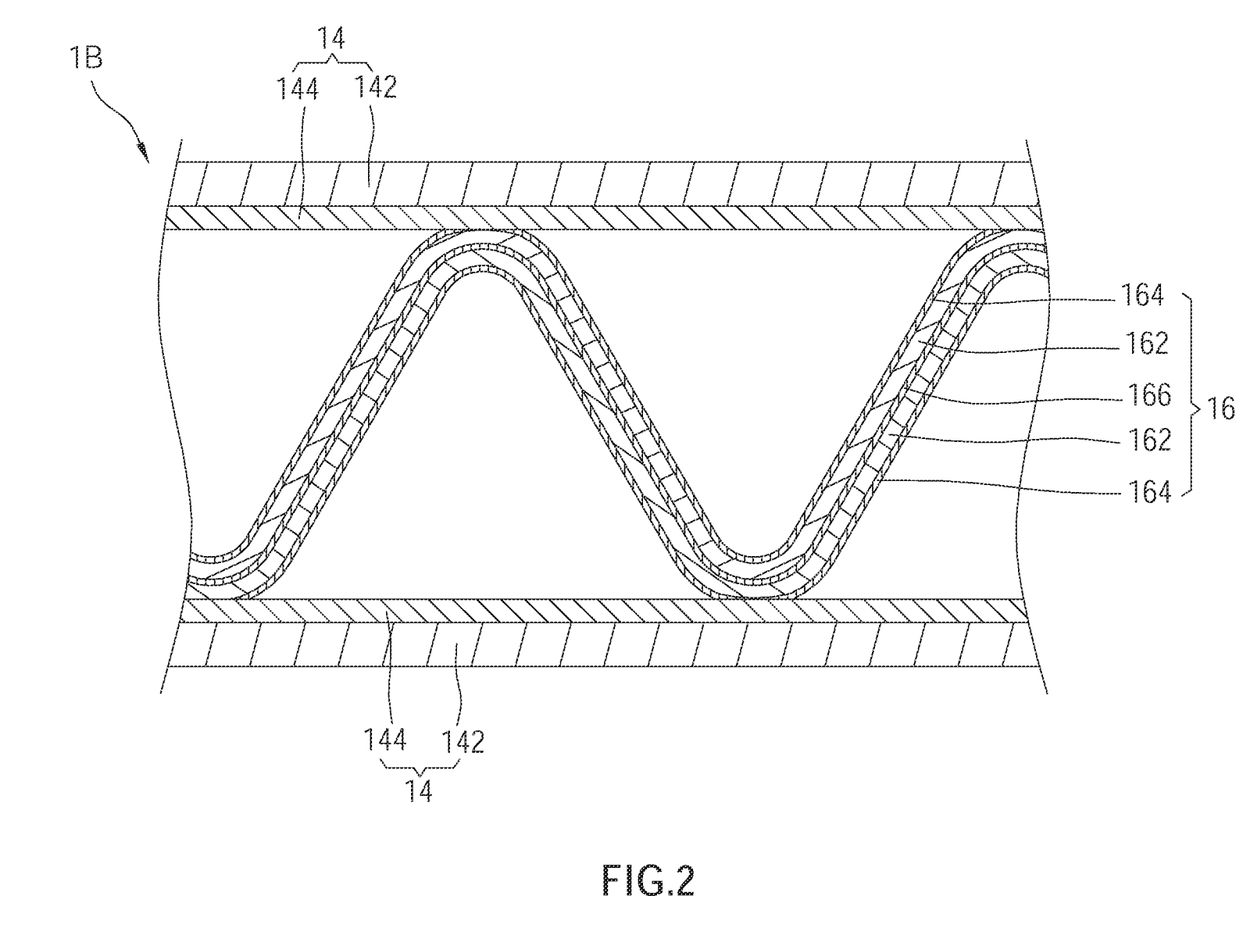
FIG. 2 is a schematic diagram of the composite waterproof corrugated paper according to a second embodiment of the present invention.

Referring to FIG. 2 which is a schematic diagram of a composite waterproof corrugated paper 1B according to a second embodiment of the present invention, the composite waterproof corrugated paper 1B of the second embodiment is similar to the composite waterproof corrugated paper 1A of the first embodiment, except that a stone paper medium 16 of the composite waterproof corrugated paper 1B of the current embodiment further includes a first toughened layer 166.

The stone paper medium 16 of the composite waterproof corrugated paper 1B of the second embodiment includes two first body layers 162, two adhesive layers 164, and the first toughened layer 166, wherein the first toughened layer 166 is disposed between the two first body layers 162, and both of the first toughened layer 166 and the first body layers 162 are disposed between the two adhesive layers 164. In the second embodiment, the first toughened layer 166 and the first body layers 162 are coextruded first, and the two adhesive layers 164 and the coextruded first toughened layer 166 and the first body layers 162 are coextruded to form the stone paper medium 16. In the second embodiment, compositions of the first body layers 162 and the adhesive layers 164 and a composition of the stone liner papers 14 are the same as that of the first embodiment, thus we are not going to describe in details herein.

In the second embodiment, a fourth plastic material accounts for 60 wt %-80 wt % of a weight of the first toughened layer 166, the inorganic material accounts for 20 wt %-30 wt % of the weight of the first toughened layer 166, and an additive accounts for 0 wt %-20 wt % of the weight of the first toughened layer 166, wherein a sum of weight percentages of the fourth plastic material, the inorganic material, and the additive is equal to 100 wt % of the first toughened layer 166. In the second embodiment, the fourth plastic material includes high-density polyethylene (HDPE), polypropylene (PP), polystyrene (PS), or a combination thereof; the additive includes a processing additive, a slip agent, a toughening agent, or a combination thereof, wherein the slip agent includes zinc stearate, magnesium stearate, or a combination thereof. In the second embodiment, a total thickness of the first toughened layer 166 is 0.1-0.2 times a total thickness of the first body layers 162. Preferably, the total thickness of the first toughened layer 166 is 0.12-0.18 times the total thickness of the first body layers 162.

Figure 3:
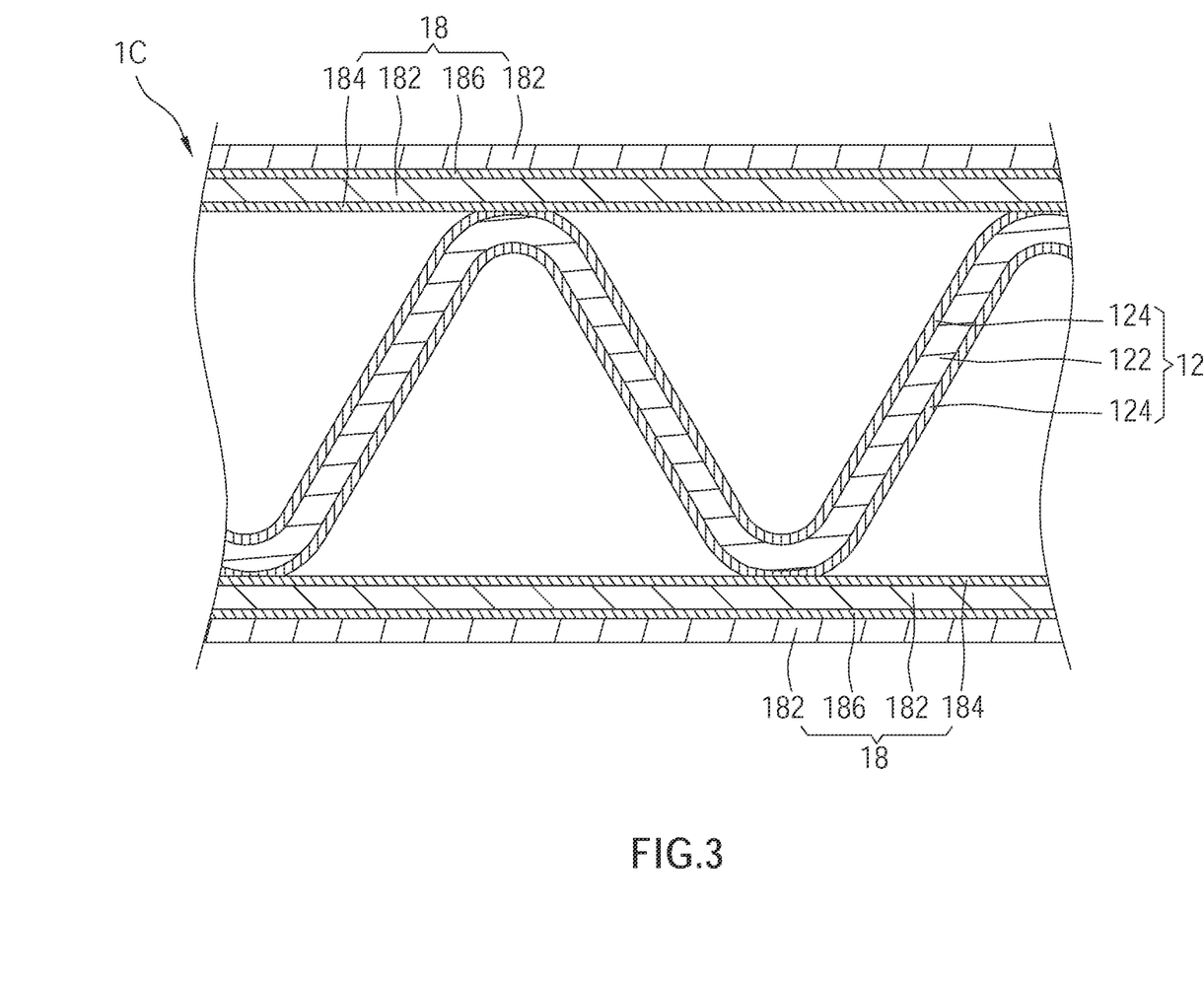
FIG. 3 is a schematic diagram of the composite waterproof corrugated paper according to a third embodiment of the present invention.

Referring to FIG. 3 which is a schematic diagram of a composite waterproof corrugated paper 1C according to a third embodiment of the present invention, the composite waterproof corrugated paper 1C of the third embodiment is similar to the composite waterproof corrugated paper 1A of the first embodiment, except that a stone liner paper 18 of the composite waterproof corrugated paper 1C of the current embodiment further includes a second toughened layer 186.

The stone liner paper 18 of the waterproof corrugated paper 1C of the third embodiment includes two second body layers 182, a supplementary layer 184, and the second toughened layer 186, wherein the second toughened layer 186 is disposed between the two second body layers 182, and one of the second body layers 182 is disposed between the second toughened layer 186 and the supplementary layer 184. In the third embodiment, the second toughened layer 186 and the two second body layers 182 are coextruded first, and the supplementary layer 184 and the coextruded second toughened layer 186 and the two second body layers 182 are coextruded to form the stone liner paper 18. In the third embodiment, compositions of the stone paper medium 12, the two second body layers 182, and the supplementary layer 184 of the stone liner paper 18 are the same as that of the first embodiment, thus we are not going to describe in details herein.

In the third embodiment, a fourth plastic material accounts for 60 wt %-80 wt % of a weight of the second toughened layer 186, the inorganic material accounts for 20 wt %-30 wt % of the weight of the second toughened layer 186, and an additive accounts for 0 wt %-20 wt % of the weight of the second toughened layer 186, wherein a sum of weight percentages of the fourth plastic material, the inorganic material, and the additive is equal to 100 wt % of the second toughened layer 186. In the third embodiment, the fourth plastic material includes high-density polyethylene (HDPE), polypropylene (PP), polystyrene (PS), or a combination thereof; the additive includes a processing additive, a slip agent, a toughening agent, or a combination thereof, wherein the slip agent includes zinc stearate, magnesium stearate, or a combination thereof. In the third embodiment, a total thickness of the second toughened layer 186 is 0.1-0.2 times a total thickness of the second body layers 182. Preferably, the total thickness of the second toughened layer 186 is 0.12-0.18 times the total thickness of the second body layers 182.

Figure 4:
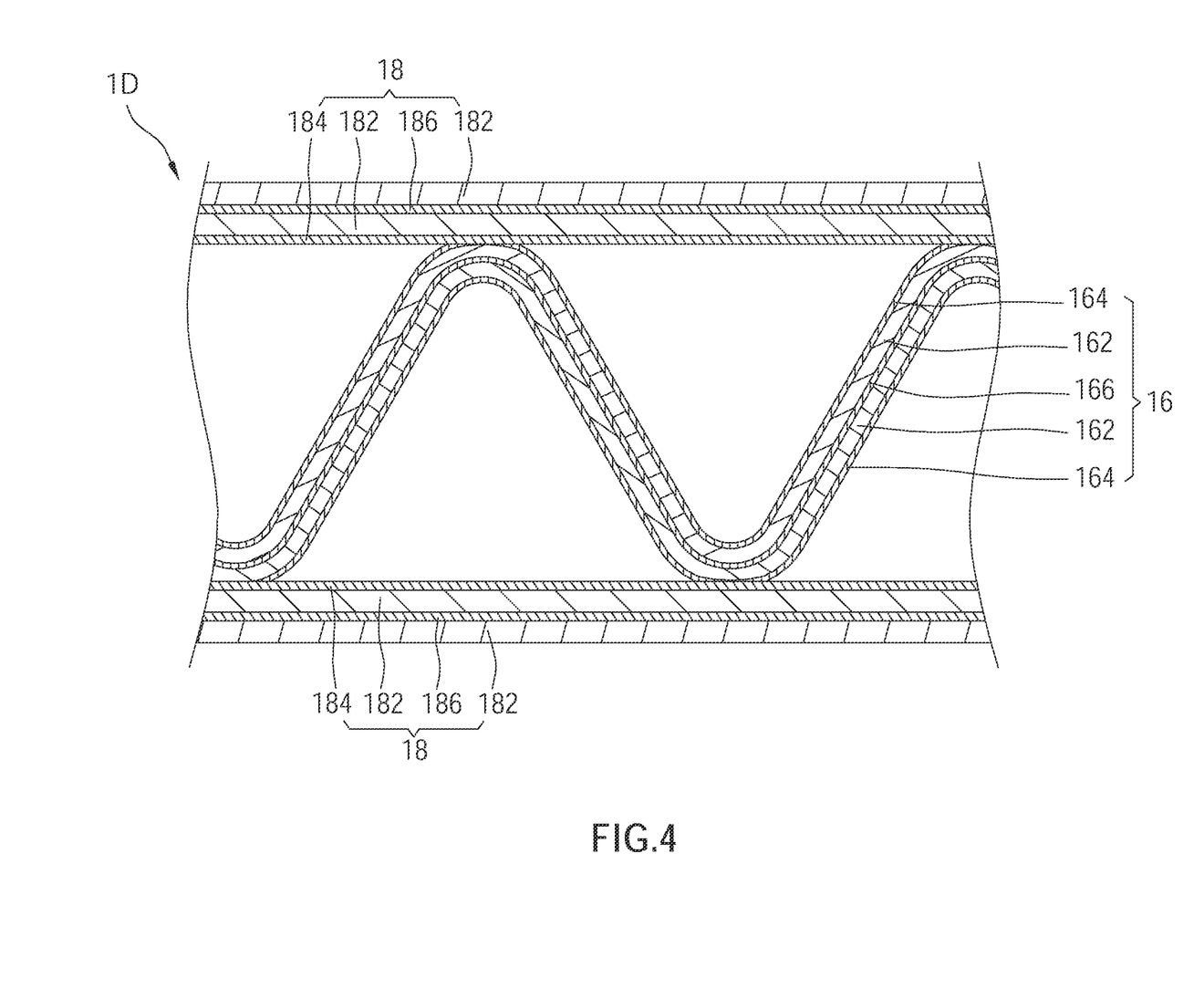
FIG. 4 is a schematic diagram of the composite waterproof corrugated paper according to a fourth embodiment of the present invention.

Referring to FIG. 4 which is a schematic diagram of a composite waterproof corrugated paper 1D according to a fourth embodiment of the present invention, the composite waterproof corrugated paper 1D of the fourth embodiment is formed by the stone paper medium 16 of the composite waterproof corrugated paper 1B of the second embodiment and the stone liner paper 18 of the composite waterproof corrugated paper 1C of the third embodiment. In the fourth embodiment, compositions of the stone paper medium 16 and the stone liner paper 18 are the same as that of the second embodiment and the third embodiment, thus we are not going to describe in details herein.

A manufacturing method of a composite waterproof corrugated paper according to an embodiment of the present invention is also disclosed. Take the composite waterproof corrugated paper 1A of the first embodiment as an example, a manufacturing method thereof includes at least following steps:

Step S01: the stone paper medium 12 is provided, wherein the stone paper medium 12 includes the first body layer 122 and the adhesive layer 124 which are coextruded; the first body layer 122 includes the first surface; the adhesive layer 124 is disposed on the first surface of the first body layer 122;

Step S02: make the stone paper medium 12 be waveshaped and have the first fluting surface, wherein the first fluting surface is located on the adhesive layer 124;

Step S03: the stone liner paper 14 is provided, wherein the stone liner paper 14 includes the second body layer 142 and the supplementary layer 144 which are coextruded; the supplementary layer 144 is disposed on the second body layer 142;

Step S04: the stone paper medium 12 is heated to make the adhesive layer 124 in a molten state;

Step S05: the supplementary layer 144 of the stone liner paper 14 is attached to the wave crests of the first fluting surface, so that the stone paper medium 12 and the stone liner paper 14 are adhered via the adhesive layer 124 which is in the molten state.

In step S01 and step S02, the at least one adhesive layer 124 of the stone paper medium 12 includes a plurality of adhesive layers 124, and the first body layer 122 includes the second surface opposite to the first surface; the stone paper medium 12 has the second fluting surface opposite to the first fluting surface; at least one of the adhesive layers 124 is disposed on the first surface of the first body layer 122, and at least another one of the adhesive layers 124 is disposed on the second surface of the first body layer 122; the first fluting surface is located on one of the adhesive layers 124, and the second fluting surface is located on another one of the adhesive layers 124.

In step S03 and step S04, the stone liner paper 14 includes a plurality of stone liner papers 14, wherein the stone paper medium 12 is heated to make the adhesive layers 124 in a molten state; the supplementary layer 144 of one of the stone liner papers 14 is attached to the wave crests of the first fluting surface, so that the stone paper medium 12 and the stone liner paper 14 are adhered via at least one of the adhesive layers 124, while the supplementary layer 144 of another one of the stone liner papers 14 is attached to the wave crests of the second fluting surface, so that the stone paper medium 12 and the stone liner paper 14 are adhered via at least another one of the adhesive layers 124.

In the first embodiment, the inorganic material accounts for 60 wt %-85 wt % of the weight of each of the first body layer 122 and the second body layer 142, and the first plastic material accounts for 15 wt %-40 wt % of the weight of each of the first body layer 122 and the second body layer 142; the second plastic material accounts for 30 wt %-50 wt % of the weight of the adhesive layer 124, the third plastic material accounts for 30 wt %-50 wt % of the weight of the adhesive layer 124, and the elastic material accounts for 0 wt %-40 wt % of the weight of the adhesive layer 124; the composition of the supplementary layer 144 is the same as the adhesive layer 124 or is made of the polymer.

In the first embodiment, the polymer includes polyethylene (PE), polypropylene (PP), polystyrene (PS), acrylonitrile-butadiene-styrene copolymer (ABS resin), polyester, polyamide (PA), polyurethane (PU), polycarbonate (PC), polyvinyl chloride (PVDC), poly methyl methacrylate (PMMA), polytetrafluoroethylene (PTFE), polyether ether ketone (PEEK), polyetherimide, polylactic acid (PLA), or a combination thereof.

In the first embodiment, the first plastic material includes high-density polyethylene (HDPE), polypropylene (PP), polystyrene (PS), or a combination thereof; the second plastic material includes high-density polyethylene (HDPE); the third plastic material includes ethylene-vinyl acetate copolymer (EVA), low-density polyethylene (LDPE), linear low-density polyethylene (LLDPE), metallocene linear low-density polyethylene (MLLDPE), or a combination thereof; the inorganic material is an inorganic powder with a grain size of 2-10 micrometers (μm), wherein the inorganic powder is made by grinding a natural stone; the elastic material includes a mixture of a metal glue and polyolefin elastomer.

In the first embodiment, the total thickness of the adhesive layer 124 is 0.05-0.15 times the total thickness of the first body layer 122 of the stone paper medium 12, and the total thickness of the supplementary layer 144 is 0.05-0.15 times the total thickness of the second body layer 142 of the stone liner paper 14.

In the first embodiment, the additive accounts for smaller than 2 wt % of the weight of each of the first body layer 122 and the second body layer 142, and includes the processing additive, the slip agent, the toughening agent, or a combination thereof, wherein the slip agent includes zinc stearate, magnesium stearate, or a combination thereof.

In the second embodiment and the fourth embodiment, the stone paper medium 16 includes a plurality of first body layers 162 and the first toughened layer 166 disposed between one of the first body layers 162 and another one of the first body layers 162, wherein the first toughened layer 166 and the first body layers 162 are coextruded.

Referring to FIG. 2 and FIG. 4, the first body layers 162 includes two first body layers 162, and the adhesive layers 164 includes two adhesive layers 164, wherein the first toughened layer 166 is disposed between the two first body layers 162; the first toughened layer 166 and the two first body layers 162 are coextruded; both of the first toughened layer 166 and the two first body layers 162 are disposed between the two adhesive layers 164; the two adhesive layers 164 and the coextruded first toughened layer 166 and the two first body layers 162 are coextruded.

In the second embodiment and the fourth embodiment, the fourth plastic material accounts for 60 wt %-80 wt % of the weight of the first toughened layer 166, the inorganic material accounts for 20 wt %-30 wt % of the weight of the first toughened layer 166, and the additive accounts for 0 wt %-20 wt % of the weight of the first toughened layer 166.

In the third embodiment and the fourth embodiment, the stone liner paper 18 includes a plurality of second body layers 182 and the second toughened layer 186 disposed between one of the second body layers 182 and another one of the second body layers 182, wherein the second toughened layer 186 and the second body layers 182 are coextruded.

Referring to FIG. 3 and FIG. 4, the second body layers 182 includes two second body layers 182, wherein the second toughened layer 186 is disposed between the two second body layers 182; the second toughened layer 186 and the two second body layers 182 are coextruded; one of the two second body layers 182 is disposed between the second toughened layer 186 and the supplementary layer 184; the supplementary layer 184 and the coextruded second toughened layer 186 and the two second body layers 182 are coextruded.

In the third embodiment and the fourth embodiment, the fourth plastic material accounts for 60 wt %-80 wt % of the weight of the second toughened layer 186, the inorganic material accounts for 20 wt %-30 wt % of the weight of the second toughened layer 186, and the additive accounts for 0 wt %-20 wt % of the weight of the second toughened layer 186.

In the second embodiment to the fourth embodiment, the fourth plastic material includes high-density polyethylene (HDPE), polypropylene (PP), polystyrene (PS), or a combination thereof; the inorganic material is an inorganic powder with a grain size of 2-10 micrometers (μm), wherein the inorganic powder made by grinding a natural stone; the additive includes a processing additive, a slip agent, a toughening agent, or a combination thereof, wherein the slip agent includes zinc stearate, magnesium stearate, or a combination thereof.

In each of the embodiments of the present invention, the stone paper medium 12, 16 is heated to 110-180 degrees Celsius, preferably 130-160 degrees Celsius, to make the adhesive layer 124, 164 in a melted state, so that the supplementary layer 144, 184 of the stone liner paper 14, 18 could be attached to the wave crests of the first fluting surface of the stone paper medium 12, 16, thereby the stone paper medium 12, 16 could tightly adhere to the stone liner paper 14, 18 when the adhesive layer 124, 164 cools down.

In each of the embodiments of the present invention, the stone paper medium 12, 16 could adhere to the stone liner paper 14, 18 via a stone glue (not shown), wherein the stone glue is heated to 130-180 degrees Celsius to be in a melted state, so that a temperature of a manufacturing environment of the composite waterproof corrugated paper 1A-1D is kept between 130-160 degrees Celsius to avoid the stone glue cooling down fast, and the stone paper medium 12, 16 and the stone liner paper 14, 18 would be slightly softened at this time. When the stone glue which is in the melted state is applied to the stone paper medium 12, 16 and the stone liner paper 14, 18, sites of the stone paper medium 12, 16 and the stone liner paper 14, 18, which contact with the stone glue, would be slightly melted, so that a part of the stone paper medium 12, 16 and a part of the stone liner paper 14, 18 would be mixed with the stone glue; after the stone glue cools down, the stone paper medium 12, 16 and the stone liner paper 14, 18 could be engaged more tightly and be hard to be disengaged by an external force.

In the current embodiment, the composite waterproof corrugated paper 1A of the first embodiment, the composite waterproof corrugated paper 1B of the second embodiment, the composite waterproof corrugated paper 1C of the third embodiment, and the composite waterproof corrugated paper 1D of the fourth embodiment are applied to package seafood, vegetables, and fruits, but not limited thereto. In practice, the composite waterproof corrugated papers 1A-1D provided by the first to fourth embodiments of the present invention could be applied to package any kind of stuff and could be used to package frozen seafood and meat or to package the vegetables and fruits which are cooled down by spraying 5-13 degrees Celsius water. For example, the composite waterproof corrugated papers 1A-1D could be further processed to produce composite waterproof corrugated paper boxes, composite waterproof corrugated paper bags, or composite waterproof corrugated paper rings to be used as a packaging material.

With the aforementioned design, the main ingredient of the composite waterproof corrugated paper includes the inorganic powder made by grinding natural stone and a little of linear polyolefin plastic material for binding, so that it could completely avoid using wood pulp. Besides, comparing to the conventional corrugated paper made of the wood pulp paper, the composite waterproof corrugated paper provided by the present invention has significantly waterproof and frost resistant ability. Even if the composite waterproof corrugated paper is frozen and unfrozen repeatedly, the composite waterproof corrugated paper could maintain a good strength and still could be easily transported without being broken. Therefore, the composite waterproof corrugated paper provided by the present invention could be applied to package the products which need to be cooled or be frozen, such as vegetables, fruits, fish, meat, and so on, and could tolerate a low temperature lower than or equal to minus 40 degrees Celsius. Additionally, the composite waterproof corrugated paper provided by the present invention doesn't absorb water(moisture), and the characteristic of the Calcium Carbonate ($CaCO_3$) could avoid the growth of mold or bacteria, so that the composite waterproof corrugated paper ensures the hygiene of the packaged food without adding an additional antibacterial and antifungal agent. Moreover, since the additional antibacterial and antifungal agent doesn't need to be added, there is no food safety issue. When the package contains the containers having liquid (e.g. water, drinks or condiments), once the liquid leaks out, the conventional corrugated paper made of wood pulp paper absorbs the liquid easily, causing the corrugated paper broken, so that the containers in the package is possibly dropped from the package; even the corrugated paper made of the wood pulp papers located under the leaky container could be broken due to absorbing liquid. At this time, the mold and bacteria could easily grow on the corrugated paper made of the wood pulp papers which absorbs water. In contrast to the conventional corrugated paper made of the wood pulp papers, the composite waterproof corrugated paper provided by the present invention would not be broken due to absorbing water, so that the packaged containers would not drop, thereby to protect the completeness of other container having liquid and to keep the composite waterproof corrugated paper boxes being stacked in a good state. Besides, the composite waterproof corrugated paper provided by the present invention doesn't absorb water, so that the mold or bacteria couldn't grow on the composite waterproof corrugated paper.

Furthermore, the composite waterproof corrugated paper provided by the present invention could be recycled after undergoing a simple sanitizing process, thereby to reach a goal of reducing waste. It is worthy to mention that comparing to the conventional corrugated paper made of the wood pulp papers, the composite waterproof corrugated paper provided by the present invention could significantly reduce the production cost, so that the usage of the conventional corrugated box made of the wood pulp papers could be reduced, thereby to reduce deforestation. Additionally, the composite waterproof corrugated paper provided by the present invention is made from natural stone powder, which is easily be decomposed in the natural environment. Therefore, a goal of environmental sustainability and environmental protection could be achieved.

It must be pointed out that the embodiment described above is only a preferred embodiment of the present invention. All equivalent structures and methods which employ the concepts disclosed in this specification and the appended claims should fall within the scope of the present invention.

What is claimed is:

1. A composite waterproof corrugated paper, comprising:
a stone paper medium having a first fluting surface and comprising at least one first body layer and at least one adhesive layer, wherein the at least one first body layer comprises a first smooth surface; wherein the at least one adhesive layer comprises an adhesive layer, the adhesive layer is disposed on the first smooth surface of the at least one first body layer; the first fluting surface is located on the at least one adhesive layer; and
at least one stone liner paper comprising at least one second body layer and a supplementary layer, wherein the supplementary layer is disposed on the at least one second body layer and is attached to a plurality of wave crests of the first fluting surface, so that the stone paper medium adheres to the at least one stone liner paper via the at least one adhesive layer;
wherein the at least one first body layer and the at least one second body layer respectively comprise an inorganic powder and a first plastic material; the inorganic powder accounts for 60 wt %-85 wt % of a weight of the at least one first body layer and a weight of the at least one second body layer respectively, and the first plastic material accounts for 15 wt %-40 wt % of the weight of the at least one first body layer and the weight of the at least one second body layer respectively; the at least one adhesive layer comprises a second plastic material, a third plastic material, and an elastic material; the second plastic material accounts for 30 wt %-50 wt % of a weight of the at least one adhesive layer, and the third plastic material accounts for 30 wt %-50 wt % of the weight of the at least one adhesive layer, and the elastic material accounts for 0 wt %-40 wt % of the weight of the at least one adhesive layer;
a composition of the supplementary layer is the same as the at least one adhesive layer or is made of a polymer;
wherein the at least one first body layer comprises two first body layers, and the stone paper medium comprises a first toughened layer; the first toughened layer is disposed between the two first body layers; wherein the first toughened layer comprises a fourth plastic material, an inorganic powder, and an additive; the fourth plastic material accounts for 60 wt %-80 wt % of a weight of the first toughened layer; the inorganic powder accounts for 20 wt %-30 wt % of the weight of the first toughened layer; the additive accounts for 0 wt %-20 wt % of the weight of the first toughened layer, the shape of the first toughened layer corresponds to the fluting surface of the two first body layers, the two first body layers are separated by the first toughened layer and do not contact each other;
wherein the at least one second body layer comprises two second body layers, and the at least one stone liner paper comprises a second toughened layer, the two second body layers are separated by the second toughened layer and do not contact each other;
wherein the second toughened layer comprises a fourth plastic material, an inorganic powder, and an additive; the fourth plastic material accounts for 60 wt %-80 wt % of a weight of the second toughened layer; the inorganic powder accounts for 20 wt %-30 wt % of the weight of the second toughened layer; the additive accounts for 0 wt %-20 wt % of the weight of the second toughened layer, the second toughened layer and the each second body layers are the same structure, the second toughened layer corresponds is attached flat between the two second body layers;

wherein the at least one adhesive layer is in a melted state upon being heated to 110-180 degrees Celsius.

2. The composite waterproof corrugated paper as claimed in claim 1, wherein the polymer comprises polyethylene (PE), polypropylene (PP), polystyrene (PS), acrylonitrile-butadiene-styrene copolymer (ABS resin), polyester, polyamide (PA), polyurethane (PU), polycarbonate (PC), polyvinyl chloride (PVDC), poly methyl methacrylate (PMMA), polytetrafluoroethylene (PTFE), polyether ether ketone (PEEK), polyetherimide, polylactic acid (PLA), or a combination thereof.

3. The composite waterproof corrugated paper as claimed in claim 1, wherein the first plastic material comprises high-density polyethylene (HDPE), polypropylene (PP), polystyrene (PS), or a combination thereof.

4. The composite waterproof corrugated paper as claimed in claim 1, wherein the two first body layer and the two second body layer respectively comprise an additive which accounts for smaller than 2 wt % of the weight of the two first body layer and the weight of the two second body layer respectively.

5. The composite waterproof corrugated paper as claimed in claim 1, wherein the second plastic material comprises high-density polyethylene (HDPE).

6. The composite waterproof corrugated paper as claimed in claim 1, wherein the third plastic material comprises ethylene-vinyl acetate copolymer (EVA), low-density polyethylene (LDPE), linear low-density polyethylene (LLDPE), metallocene linear low-density polyethylene (MLLDPE), or a combination thereof.

7. The composite waterproof corrugated paper as claimed in claim 1, wherein the elastic material comprises a mixture of a metal glue and polyolefin elastomer.

8. The composite waterproof corrugated paper as claimed in claim 1, wherein a total thickness of the at least one adhesive layer is 0.05-0.15 times a total thickness of the two first body layer of the stone paper medium, and a total thickness of the supplementary layer is 0.05-0.15 times a total thickness of the two second body layer of the at least one stone liner paper.

9. The composite waterproof corrugated paper as claimed in claim 1, wherein the at least one adhesive layer comprises a plurality of adhesive layers, and the two first body layer comprises a second surface opposite to the first surface; the stone paper medium has a second fluting surface opposite to the first fluting surface; at least one of the adhesive layers is disposed on the first surface of the two first body layer, and at least another one of the adhesive layers is disposed on the second surface of the two first body layer; the first fluting surface is located on one of the adhesive layers, and the second fluting surface is located on another one of the adhesive layers; the at least one stone liner paper comprises a plurality of stone liner papers; the supplementary layer of one of the stone liner papers is attached to the wave crests of the first fluting surface, so that the stone paper medium and one of the stone liner papers are adhered via one of the adhesive layers, while the supplementary layer of another one of the stone liner papers is attached to a plurality of wave crests of the second fluting surface, so that the stone paper medium and another one of the stone liner papers are adhered via another one of the adhesive layers.

10. The composite waterproof corrugated paper as claimed in claim 1, wherein the adhesive layers comprise two adhesive layers; the first toughened layer is disposed between the two first body layers, and both of the first toughened layer and the two first body layers are disposed between the two adhesive layers.

11. The composite waterproof corrugated paper as claimed in claim 1, wherein a total thickness of the first toughened layer is 0.1-0.2 times a total thickness of the first body layers of the stone paper medium.

12. The composite waterproof corrugated paper as claimed in claim 1, wherein the second toughened layer is disposed between the two second body layers; one of the two second body layers is disposed between the second toughened layer and the supplementary layer.

13. The composite waterproof corrugated paper as claimed in claim 1, wherein a total thickness of the second toughened layer is 0.1-0.2 times a total thickness of the two second body layers of the stone liner papers.

14. The composite waterproof corrugated paper as claimed in claim 1, wherein the fourth plastic material comprises high-density polyethylene (HDPE), polypropylene (PP), polystyrene (PS), or a combination thereof.

15. The composite waterproof corrugated paper as claimed in claim 1, wherein the fourth plastic material comprises high-density polyethylene (HDPE), polypropylene (PP), polystyrene (PS), or a combination thereof.

16. The composite waterproof corrugated paper as claimed in claim 1, wherein the inorganic powder of the two first body layer and the inorganic powder of the two second body layer respectively are a grain size of 2-10 micrometers ($\mu$m); the inorganic powder of the two first body layer and the two second body layer is made by grinding a natural stone.

17. The composite waterproof corrugated paper as claimed in claim 1, wherein the inorganic powder of the two first body layer, the inorganic powder of the two second body layer, and the inorganic powder of the first toughened layer are an inorganic powder with a grain size of 2-10 micrometers ($\mu$m); the inorganic powder is made by grinding a natural stone.

18. The composite waterproof corrugated paper as claimed in claim 1, wherein the inorganic powder of the two first body layer, the inorganic powder of the two second body layer, and the inorganic powder of the second toughened layer are an inorganic powder with a grain size of 2-10 micrometers ($\mu$m); the inorganic powder is made by grinding a natural stone.

19. The composite waterproof corrugated paper as claimed in claim 4, wherein the additive is selected from a group consisting of a processing additive, a slip agent, a toughening agent, and a combination thereof.

20. The composite waterproof corrugated paper as claimed in claim 1, wherein the additive is selected from a group consisting of a processing additive, a slip agent, a toughening agent, and a combination thereof.

21. The composite waterproof corrugated paper as claimed in claim 1, wherein the additive of the first toughened layer and the additive of the second toughened layer both are comprising zinc stearate, magnesium stearate, or a combination thereof.

* * * * *